3,264,277
OLEFIN POLYMERIZATION PROCESS IN THE PRESENCE OF A ZIEGLER-NATTA TYPE CATALYST MODIFIED WITH TRIBUTYL PHOSPHITE
De Loss E. Winkler, Orinda, and George W. Hearne, Lafayette, Calif., assignors to Shell Oil Company, New York, N.Y., a corporation of Delaware
No Drawing. Filed Apr. 27, 1964, Ser. No. 362,988
3 Claims. (Cl. 260—93.7)

This application is a continuation-in-part of our co-pending patent application Serial No. 808,956, filed April 27, 1959, now U.S. Patent No. 3,147,238.

This invention relates to improved methods for the polymerization of alpha-olefins. More particularly, it relates to improved methods for the polymerization of alpha-monoolefins whereby products of improved quality are obtained.

It is now well known that polymers of alpha-olefins may be prepared at low temperatures and pressures in the presence of certain catalyst compositions. Such processes are conducted at temperatures ranging from about room temperature to about 150° C. and pressures below about 500 pounds per square inch (psi). The catalysts are designated in the art generally as "Ziegler catalysts" or "low pressure catalysts." Such catalysts are capable of polymerizing alpha-olefins, as ethylene, butene-1, propene, styrene and other alpha-olefins.

The present invention relates to improved methods of producing polyethylene, polypropylene, polystyrene, and other polymers of alpha-olefins. It also relates to the polymerization of mixtures of such olefins to produce copolymers. As the technology as it relates to the polymerization of various alpha-olefins by the use of low pressure catalysts is substantially the same for all, this invention will be described as it relates to the production of certain homopolymers but it will be understood that the invention is of general application to the polymerization of alpha-olefins and copolymers thereof using the "low pressure catalysts."

The so-called "low pressure catalysts" which are utilized in the processes of this invention be selected from the following two groups, designated A and B; they are used, according to this invention, with an additional component which will be described hereinafter.

A. The reaction product of (1) a compound of a transition metal selected from the group consisting of titanium and vanadium with (2) a compound of the formula $R_1R_2AlX$ wherein $R_1$ and $R_2$ each are hydrocarbon groups and X is halogen;

B. The reaction product of (1) a compound of a transition metal selected from the group consisting of titanium and vanadium with (2) aluminum trialkyl.

It is known that the low pressure polymerization of olefins such as propylene produces polymers that are designated in the art generally as "crystalline polymers." These crystalline polymers are distinguished from amorphous polymers not only by their structural formula but also by their respective physical properties. The solid product of any given polymerization, e.g., of propylene, using "low pressure catalyst" and conditions is generally found to contain both crystalline and amorphous components. Analytical methods to determine the degree of crystallinity are available. It is found that with increasing crystallinity the physical properties become increasingly more desirable for certain commercial applications.

It is an object of this invention to provide improved methods for the polymerization of alpha-olefins whereby the crystalline content of the polymer is increased. It is another object of this invention to provide improved methods for the polymerization of alpha-olefins, particularly propylene, at low temperatures and pressures, using the so-called "low pressure catalysts" wherein an additive increases the crystalline content of the resulting polymer. It is a further object to provide improved methods for the polymerization of alpha-olefins, particularly propylene, wherein an additive permits carrying out the reaction at a higher temperature without loss of crystalline content of the polymer. Other objects will become apparent from the detailed description of the invention.

These and other objects are accomplished in the method for the polymerization of alpha-olefins at temperatures below about 150° C. and pressures below about 500 p.s.i. by the improvement which comprises conducting the polymerization in the presence of a low pressure catalyst and a minor amount of a hydrocarbyl ester of phosphorous acid. The degree of improvement in the crystalline content of the polymer and/or process conditions will vary, depending on a number of factors as will appear more fully hereinafter.

It has been found that addition of a selected amount of tributylphosphite is particularly advantageous when certain preferred low pressure catalysts are employed. One of these is the novel catalysts described in U.S. 2,971,925 to Winkler et al. The catalyst compositions of this invention is the reaction product formed by the steps comprising (1) reacting hydrocarbon solutions of aluminum triethyl and titanium tetrachloride in a mole ratio ranging from about 0.1:1 to less than 0.4:1 at elevated temperatures until the aluminum triethyl is completely oxidized and (2) thereafter reacting the total product of (1) with a hydrocarbon solution of aluminum diethyl chloride in an amount to give a total aluminum to titanium mole ratio of at least 1:1. The resulting product is a polymerization catalyst for alpha-monoolefins and is capable of producing polymer having improved physical properties. This is particularly the case as it relates to the polymer of propylene.

A second preferred catalyst is the reaction product which is formed by the steps comprising (1) reacting hydrocarbon solutions of aluminum triethyl and titanium tetrachloride in a mole ratio ranging from about 0.1:1 to less than 0.4:1 at elevated temperatures until the aluminum triethyl is completely oxidized and (2) thereafter reacting the total reaction product of (1) with a hydrocarbon solution of aluminum triethyl in an amount to give a total aluminum to titanium mole ratio of at least 1:1.

In the preparation of these particular preferred types of catalysts, the order of reaction is critical as well as the amount of the specific catalyst components. The only substantial latitude permitted in the preparation of the preferred types of catalysts is in the heat treatments and in the concentrations of the components in the hydrocarbon solvent.

In the first step of the preparation of either of the preferred types of catalysts, the reaction between titanium tetrachloride and aluminum triethyl effects a reduction of some of the titanium tetrachloride to titanium trichloride. Stoichiometrically complete reduction is accomplished by the reaction of 0.33 mole of aluminum triethyl with 1 mole of the titanium tetrachloride; there must not be 0.4 or more moles of the aluminum triethyl per mole of the titanium tetrachloride. Hence the reaction in the first step between aluminum triethyl and titanium tetrachloride must be in an aluminum triethyl to titanium tetrachloride mole ratio of less than 0.4 to 1. The minimum ratio is 0.1 to 1. In the more preferred procedures the mole ratio is between 0.2–0.33:1 as these ratios ultimately produce the best combination of polymerization rates, conversions and percentages of linear polymer.

The reaction between titanium tetrachloride and aluminum triethyl is carried out at elevated temperatures for a period of time sufficient to oxidize all of the aluminum triethyl. The time is influenced by the temperature; heating for 20 minutes at 80° C. is suggested as a minimum while heating for 2 hours at 80° C. is particularly suitable. A rather surprising finding is that polypropylene of a substantially higher crystallinity is obtained if the heating is carried out for periods of time substantially in excess of the minimum required to oxidize the aluminum triethyl. No explanation is offered for this phenomenon other than to surmise that a different catalyst intermediate, which has not been identified, is formed by the longer heat treatment.

The initial reaction between titanium tetrachloride and aluminum triethyl is carried out with these reactants in solution with hydrocarbon solvents as pentane, isopentane, heptane, octane and the like. The solutions of titanium tetrachloride and aluminum triethyl are prepared, and measured amounts of each solution are mixed together to give the desired aluminum to titanium mole ratios which range from less than 0.4:1 to about 0.1:1. The hydrocarbon solutions of the catalyst components may be of any concentration; solutions containing 100 millimoles of reactant per liter of solvent are found to be convenient for subsequent metering. A surprising finding is that advantages in the ultimate polymer are obtained as the concentrations of the components in the solvent are increased.

The reaction between titanium tetrachloride and aluminum triethyl at elevated temperatures terminates the first step of the catalyst preparation. At this point the reaction mixture comprises a solid suspension in the hydrocarbon diluent and the total mixture has a brown or purple color, depending on the Al/Ti ratio and the heating time and temperature.

The second step of the preparation of the improved catalysts of U.S. 2,971,925 requires adding to and reacting with the total mixture prepared in step (1) aluminum diethyl chloride which is contained in solution with a hydrocarbon solvent. The amount of the aluminum diethyl chloride added may vary a great deal with the provision that the minimum be at least sufficient to provide a total aluminum to titanium mole ratio of 1:1. More preferred, however, the aluminum diethyl chloride is added in excess of the unreacted titanium tetrachloride of the first step. Thus the minimum depends entirely on the mole ratio of the aluminum triethyl and titanium tetrachloride selected in the first step. Any amount greater than the minimum is suitable but large excesses, say in the order of 10 moles, are uneconomical and wasteful. In the preferred procedure, aluminum diethyl chloride is added in an amount to give a total aluminum to titanium mole ratio ranging from about 2:1 to about 6:1.

After the aluminum diethyl chloride is added, the total mixture, which is brown in color, is agitated briefly to reduce the titanium tetrachloride completely. It is not necessary to cool or heat the mixture to which the aluminum diethyl chloride is added and the catalyst will be stable for several days. The total mixture consists of a suspension of fine, brown particles in the hydrocarbon solvent. The suspension, if permitted to stand for a while, will begin to settle. According, before being used, it should be agitated in order to produce a homogeneous product which is used as catalyst.

The second step of the preparation of the second preferred type of catalyst requires adding to and reacting with the total mixture prepared in step (1) aluminum triethyl which is contained in solution in a hydrocarbon solvent. The amount of aluminum triethyl that is added may vary, provided that it is at least sufficient to provide a total aluminum to titanium ratio of 1:1. More preferred, however, the aluminum triethyl is added in excess of the unreacted titanium tetrachloride of the first step. Thus, the minimum depends entirely on the mole ratio of the aluminum triethyl and titanium tetrachloride selected in the first step. Any amount greater than the minimum is suitable but large excesses, say of the order of 10 moles, are uneconomical and wasteful. In the preferred procedure, aluminum triethyl is added in amount to give a total aluminum to titanium mole ratio ranging from about 2:1 to about 6:1.

After the second portion of aluminum triethyl is added, the total mixture is agitated briefly to complete the reduction of the titanium tetrachloride. The mixture rapidly turns from brown to black, the ultimate reaction product being a suspension of fine black particles in the hydrocarbon solvent. It is not necessary to cool or heat the mixture to which the additional aluminum triethyl is added, and the catalyst will be stable for several days. The suspension, if permitted to stand for a while, will begin to settle. Accordingly, before being used, it should be agitated in order to produce a homogeneous product which is used as a catalyst.

An additive of this invention is most suitably added to the solvent or vessel to which the catalyst components are added for carrying out the polymerization reaction.

In the polymerization of alpha-olefins with active low pressure catalysts, it is often found that the content of linear polymer in the total product is undesirably low. It has also been found that in some cases the reaction is very sensitive to the reaction temperature. For example, when using the catalyst of U.S. 2,971,925 the content of linear polymer in the product is quite high when the reaction temperature is about 50° C., but is much lower when the reaction is carried out at higher temperatures, up to 90° C. It is desirable, however, to operate at the higher temperatures in this range, i.a., because the reaction rate is more rapid at the higher temperatures.

In a study directed to finding methods for increasing the proportion of the linear component in low pressure polymer, experiments were made with a large number of compounds added to the reaction mixture. In some cases it was found that the additive actually lowered the content of linear polymer in the product. In other cases only relatively small improvements were obtained. However, additives according to this invention were found to provide outstandingly good improvements in the content of linear polymer in the product; their use permits increasing the reaction temperature in the case of the catalyst of U.S. 2,971,925 while maintaining a high content of linear polymer in the reaction product.

Additives to be used according to this invention are the hydrocarbyl esters of phosphorous acid ($H_3PO_3$). These compounds have the general formula $(RO)_3P$ wherein R represents a hydrocarbyl group free of terminal olefinic double bonds, preferably of from one to twelve carbon atoms per group, and most preferably an alkyl group of from one to eight carbon atoms. Suitable compounds of this type are trimethylphosphite, triethylphosphite, tri-n-propylphosphite, tri-isopropylphosphite, tri-n-butylphosphite, tri-isobutylphosphite, tri-n-octylphosphite, triphenylphosphite, tri-cyclohexylphosphite and the like. Although more complex compounds, e.g., those having mixed hydrocarbyl groups (butyl, di-isoamylphosphite, di-isopropyl-n-butylphosphite, butyl-diphenylphosphite) or those having involved hydrocarbyl structures, can be employed to give the desired effect, it is preferred for practical reasons to use commercially available compounds such as tributylphosphite, triethyl-, triphenyl- or tris(2-ethylhexyl)phosphites and the like.

The quantity of the added phosphites preferably ranges from 1 to 33 mole percent of the combined atomic proportions of metal in the catalyst. More preferred, the quantity ranges between 2 and 10 mole percent. As the quantiy of the added compound which is needed will vary depending upon a number of considerations, such as the purity of the olefin feed, the purity of the catalyst, the molecular weight desired and the like, it is preferred to first ascertain the quantity of the additive which it is most advantageous to add. This may be accomplished by an initial trial wherein a polymer is first formed without the addition of the additive; this is taken as the standard. Thereafter polymerization is conducted with, say 2, 5, 10 and 20 mole percent of the selected compound, calculated on the atomic porportion of the combined metals represented by the known amount of catalyst components of known concentration. It will be found that the stereospecificity of resulting polymer, as measured by percent insoluble, increases with increasing additive concentration. However, when increasingly larger amounts of additive are used, reaction rate begins to slow down significantly, and this usually sets the upper limit of suitable additive concentration.

The polymerizations of alpha-monoolefins according to this invention are suitably conducted in agitated pressure vessels under conditions that exclude air and other atmospheric impurities, particularly moisture. The vessel, after purging with an inert gas, is charged with a quantity of hydrocarbon solvent and a selected amount of an additive of this invention. The desired amount of catalyst is added and thereafter the monomer to be polymerized is charged to the vessel and the polymerization begins. At first, the temperature within the reactor will rise due to an exotherm so that cooling may be supplied initially in order to maintain any desired polymerization temperature, which in all cases should be less than about 100° C. and more preferably from about 40° to 80° C. The pressures are not critical and may be autogenic pressures which will vary depending upon the quantity of the solvent in the reactor, the nature of the monomer to be polymerized, the temperatures, and the like. In batch operations, the polymerization may be terminated when monomer is no longer absorbed, as indicated by a suitable pressure gauge. In continuous operations the polymerization mixture passes through a continuous reactor of any suitable design and the polymerizations in such cases are adjusted by the residence time, which may be determined by a few preliminary runs at the particular concentrations, temperatures, pressures and the like that are adopted. After the polymerization is complete the polymer is recovered as a slurry of the solid polymer in hydrocarbon dilution and a simple filtration is adequate to separate the polymer from the solvent. Thereafter the polymer may be washed a few times in order to separate catalyst residues. Further treatment may be undertaken as will be understood from the prior art.

The recovered polymer will be found, generally, to have a rather high molecular weight as indicated by intrinsic viscosity determinations in decalin at 150° C. For some applications the molecular weight may be too high and polymer of controlled molecular weight may be obtained by conducting the polymerization in the presence of various additives which reduce the molecular weight. The more effective additives for this purpose include hydrogen and zinc diethyl. In addition to these and the additives of this invention, other additives which serve other functions may be present during the polymerization. The additives, should they be used in the polymerization, are fed into the reactor before or during the polymerization and the amounts that are used will vary depending on the specific additive and the molecular weight of the polymer that it is desired to produce.

The alpha-monoolefins which can be polymerized according to the process of this invention include the normal aliphatic 1-olefins ethylene, propylene, 1-butene, 1-pentene, 1-hexene, 1-heptene and 1-octene, or mixtures thereof; branched monoolefins having a terminal double bond, such as 3-methylpentene-1, 4-methylpentene-1, 3-ethylhexene-1, and the like; and styrene and alkyl-substituted styrenes. Preferably the olefins have from two to eight carbon atoms per molecule. Feeds containing a single suitable olefin or a combination of two suitable olefins may be employed.

Although it is possible to use a technical grade of alpha-olefin containing the normal impurities it is generally preferred to use a purified olefin feed. Also, it is preferred to use a catalyst prepared from high-purity components as well as hydrocarbon diluents which are relatively free of impurities. The total quantity of impurities in the alpha-olefin to be polymerized is preferably less than 0.003% by weight. This may be illustrated for example in the case of ethylene wherein representative impurities amount to about 0.0001% by weight of acetylene, 0.0015% by weight of oxygen and about 0.0005% by weight of carbon monoxide. The various reactants may be purified in any suitable manner. Thus, for example, the olefin feed my be treated with ammoniacal cuprous chloride or hydrogen in order to decrease or remove acetylene. If desired, an acid such as sulfuric acid may be employed to treat the olefin and the solvent. This is conventionally accomplished by employing dilute acid for treating the alpha-olefin and a more concentrated acid for treating the solvent and then distilling over calcium hydride.

In the examples and tables that follow, the intrinsic viscosity (I.V.) of a polymer is determined from measurements of its specific viscosity in decalin at 150° C. and the "insolubles" content is determined by the soxhlet extraction of polymer in isooctane at its boiling point for 6 to 7 hours, using an extraction cycle of approximately 4 minutes.

*Example I*

This example illustrates the improvement obtained when additives of this invention are included in the reaction mixture for the preparation of polypropylene by contact of propylene with the above-described second preferred (black) catalyst.

A catalyst is prepared by mixing in a dry nitrogen atmosphere a hydrocarbon solution of 10 millimoles (mmoles) of $TiCl_4$ (100 ml.) with 3.6 mmoles of aluminum triethyl (36 ml.) and reacting for 2 hours at 80° C. To this there is then added 10 mmoles of aluminum triethyl and heating continued for 1 hour at 80° C. This catalyst plus additional aluminum triethyl is used to polymerize propylene in separate experiments carried out in glass bottles. To sealable bottles of 270 ml. capacity there are added a total of 5.4 mmoles of aluminum triethyl and 0.78 mmoles of titanium chloride, prepared as above, per bottle. A desired amount of a particular additive is added and about 20 g. of propylene is then dissolved in each bottle. The bottle is capped and tumbled at the rate of 20 r.p.m. in a 50° C. water bath for about 17–20 hours. The resulting polymer slurry is then added to an equal volume of ethyl alcohol to precipitate the polymer. After filtering, washing and drying the total polymer is weighed and its I.V. and content of insolubles determined.

The results of a number of experiments carried out in this manner are shown in Table 1.

TABLE 1

| Run No. | Additive Name | Additive Millimoles | Propylene Conversion, Percent | Product Percent Weight Insoluble | Product I.V. |
|---|---|---|---|---|---|
| 1 | None | | 100 | 73 | 4.0 |
| 2 | Tributylphosphite | 0.5 | 98 | 80 | |
| 3 | do | 1.0 | 98 | 78 | 6.6 |
| 4 | Acetone | 1.5 | 95 | 67 | 4.0 |
| 5 | Quinoline | 1.5 | 97 | 73 | |
| 6 | Phenyl isocyanate | 1.5 | 95 | 73 | 4.4 |
| 7 | Propionaldehyde | 1.5 | 95 | 68 | |

Run 1 shows typical values of percent insoluble and I.V. obtained with the particular catalyst employed in this series of experiments when no additive is present.

Runs 2–3 are successful runs using tributylphosphite. The additive served to substantially increase the linear content of the polymer (as indicated by percent insoluble). It also caused some increase in the molecular weight (as indicated by increased I.V.); this effect is not necessarily desirable, but can be suppressed, if it is desired to do so, by addition of certain materials during the reaction, e.g., hydrogen.

Runs 4–7 show that various other materials, used in corresponding concentrations, did not result in polypropylene of substantially improved crystallinity.

Example 2

Runs 2 and 3 are repeated, substituting for tributylphosphite triethylphosphite, trioctylphosphite, and triphenylphosphite. Similar improvements in polypropylene crystallinity are obtained.

Example 3

A catalyst is prepared by mixing under a nitrogen atmosphere a hydrocarbon solution of 10 mmoles of $TiCl_4$ (100 ml.) with 3.6 moles of $AlEt_3$ (36 ml.) and reacting 2 hours at 80° C. This mixture is then centrifuged, the supernatant liquid decanted, and 10 mmoles (100 ml.) of $AlEt_2Cl$ added and the mixture heated another hour at 80° C. This catalyst is then added to 4 liters of purified isooctane containing 80 mmoles of $AlEt_2Cl$. To various amounts of this reaction mixture, contained in a stainless steel, stirred autoclave, there is added a desired amount of an additive; propylene is then added at an average pressure of 50 p.s.i.g. After 4.5 hours the reaction is stopped by the addition of alcohol and the polymer recovered as previously described.

A series of runs are made in this manner, with and without additives, and at various temperatures. The results are shown in Table 2.

TABLE 2

| Run | 8 | 9 | 10 | 11 |
|---|---|---|---|---|
| $AlEt_2Cl$ (mmoles) | 80 | 80 | 80 | 80 |
| $TiCl_3$ (mmoles) | 18 | 7.2 | 7.2 | 9 |
| Additive (Tributylphosphite) mmoles | | | | 13 |
| Temperature, °C | 50 | 65 | 90 | 70 |
| G. Polymer/g. $TiCl_3$/hr | 35 | 51 | 119 | 40 |
| Percent Weight Insoluble | 90 | 85 | 61 | 94 |
| I.V. | 8.8 | 6.4 | 2.9 | 11.9 |
| Yield Point, p.s.i. | 3,770 | | | 3,820 |
| Tensile Strength, p.s.i. | 6,040 | | | 6,160 |
| Ultimate Elongation, percent | 900 | | | 730 |
| Flexural Stiffness, p.s.i. | 116,000 | | | 124,000 |

Runs 8–10 illustrate the effect of increasing the reaction temperature from 50° to 90° C. in the absence of an additive. The reaction rate is increased, but both the proportion of linear polymer and the molecular weight of the polymer are substantially decreased. Run 11 shows that addition of tributylphosphite to a mixture which is reacted at 70° C. results in a polymer having a higher insolubles content than polymer obtained at 50° C. in the absence of an additive, and results in some increase in the molecular weight. The reaction rate is what would be found at 55° C. in the absence of additive. However, a still higher temperature can be employed with this additive to improve the reaction rate without substantial decrease in linearity of the polymer.

Example 4

Catalysts are prepared and reactions carried out substantially as in Example 3. In the first step of the catalyst preparation, 3.0 mmoles of $AlEt_3$ is used instead of 3.6. The catalyst used in Runs 15–18 is used without separation of solids by centrifuging. In the runs illustrated in Table 3 it is shown that tributylphosphite, used in the presence of hydrogen, results in a product whose linearity is high while its molecular weight is lower than that produced in the absence of both additive and hydrogen. For the latter value, see Runs 8–10, in Example 3.

TABLE 3

| Run No. | 12 | 13 | 14 | 15 | 16 | 17 | 18 |
|---|---|---|---|---|---|---|---|
| AlEt$_2$Cl (millimoles) | 80 | 80 | 80 | 80 | 80 | 80 | 80 |
| TiCl$_3$ (millimoles) | 16 | 8 | 16 | 18 | 18 | 9 | 9 |
| Additive (Tributylphosphite) millimoles | | | 13 | | 13 | 6.5 | 3 |
| H$_2$ (ml at room conditions) | 250 | 500 | 500 | 500 | 500 | 500 | 500 |
| Temperature, °C | 50 | 70 | 70 | 50 | 70 | 70 | 70 |
| G. Polymer/g. TiCl$_3$/hr | 58 | 121 | 66 | 47 | 60 | 77 | 119 |
| Percent Weight Insoluble | 93 | 88 | 93 | 92 | 95 | 93 | 89 |
| I.V. | 3.5 | 2.3 | 2.9 | 3.0 | 2.9 | 2.7 | 2.3 |
| Melt Index (190° C.) | 0.15 | 2.72 | 0.68 | 0.33 | 0.36 | 0.74 | 1.83 |
| Yield Point, p.s.i. | 4,490 | 4,010 | 4,790 | 4,630 | 4,550 | 4,580 | 4,450 |
| Tensile Strength, p.s.i. | 4,240 | 2,680 | 3,360 | | | | |
| Ultimate Elongation, Percent | 740 | 250 | 700 | | | | |
| Flexural Stiffness, p.s.i. | 158,000 | 127,000 | 139,000 | 141,000 | 150,000 | 149,000 | 159,000 |

*Example 6*

A series of runs are carried out in a manner similar to those of Example 1, but employing as catalyst vanadium trichloride and aluminum triethyl.

In Runs 19–22, 200 ml. of solvent containing 0.4 mmoles of VCl$_3$ and 5.4 mmoles of aluminum triethyl are placed in sealable bottles. A desired amount of additive is added to each bottle, about 20 g. of propylene dissolved in the solution and the bottle sealed and treated as in Example 1.

The results of the experiments are shown in Table 4.

TABLE 4

| Run No. | Additive | | Propylene Conversion, Percent | Product | |
|---|---|---|---|---|---|
| | Name | Millimoles | | Percent Weight Insoluble | I.V. |
| 19 | None | | 65 | 80 | 7.4 |
| 20 | Tributylphosphite | 0.25 | 80 | 92 | 12.7 |
| 21 | do | 0.5 | 72 | 93 | |
| 22 | do | 1.0 | 50 | 94 | 7.5 |

The results of Table 4 show a substantial improvement in wt. percent insoluble, indicating improved crystallinity of the polymer.

*Example 7*

Polymerizations of butene-1 and of 4-methylpentene-1, carried out in the manner of Example 3, show a substantial increase in crystallinity of the resulting polymer when tributylphosphite or triisoamylphosphite are employed as additives.

From the foregoing it will readily be appreciated that the processes of this invention are capable of many modifications of the processing techniques, most of which are known in the low pressure polymerization methods of alpha-olefins. Thus, for example, the polymerization may be conducted with or without catalyst supports. It will be obvious that the method of addition of the additives of this invention may be varied as, for example, by the intermediate or irregular addition of the additive in a continuous or batch process. Further, the processes of this invention are equally suitable for controlling the polymer linearity of polymerized alpha-olefins other than those shown in the examples. However, alpha-olefins having up to ten carbon atoms are most suitable for the processes of this invention.

We claim as our invention:

1. In the process of polymerizing propylene which comprises contacting propylene with a catalyst prepared by the sequence of steps comprising (1) reacting hydrocarbon solutions of aluminum triethyl and titanium tetrachloride in a mole ratio ranging from about 0.1:1 to less than 0.4:1 at elevated temperatures until the aluminum triethyl is completely oxidized and (2) thereafter reacting the total product of (1) with a hydrocarbon solution of aluminum triethyl or aluminum diethyl chloride, in an amount to give a total aluminum to titanium mole ratio of at least 1:1; the improvement which comprises carrying out said contact in the presence of an effective amount in the range from 2 to 10 mole percent, based on the combined atomic proportions of metal in the catalyst of tributyl phosphite.

2. In the process of polymerizing propylene which comprises contacting propylene with a catalyst prepared by the sequence of steps comprising (1) reacting hydrocarbon solutions of aluminum triethyl and titanium tetrachloride in a mole ratio ranging from about 0.1:1 to less than 0.4:1 at elevated temperatures until the aluminum triethyl is completely oxidized, (2) separating the resulting solid reaction product, and (3) thereafter reacting the total product of (1) with a hydrocarbon solution of aluminum triethyl, in an amount to give a total aluminum to titanium mole ratio of at least 1:1; the improvement which comprises carrying out said contact in the presence of an effective amount in the range from 2 to 10 mole percent, based on the combined atomic proportions of metal in the catalyst of tributyl phosphite.

3. In the process of polymerizing propylene which comprises contacting propylene with a catalyst prepared by the sequence of steps comprising (1) reacting hydrocarbon solutions of aluminum triethyl and titanium tetrachloride in a mole ratio ranging from about 0.1:1 to less than 0.4:1 at elevated temeperatures until the aluminum triethyl is completely oxidized, (2) separating the resulting solid reaction product, and (3) thereafter reacting the total product of (1) with a hydrocarbon solution of aluminum diethyl chloride, in an amount to give a total aluminum to titanium mole ratio of at least 1:1; the improvement which comprises carrying out said contact in the presence of an effective amount in the range from 2 to 10 mole percent, based on the combined atomic proportions of metal in the catalyst of tributyl phosphite.

References Cited by the Examiner

UNITED STATES PATENTS

| | | | |
|---|---|---|---|
| 2,886,561 | 5/1959 | Reynolds et al. | 260—44.9 |
| 2,956,991 | 10/1960 | Coover et al. | 260—93.7 |
| 3,032,510 | 5/1962 | Tornquist et al. | 260—94.9 |
| 3,186,977 | 6/1965 | Coover et al. | 260—93.7 |

JOSEPH L. SCHOFER, *Primary Examiner.*

M. B. KURTZMAN, *Assistant Examiner.*